(12) United States Patent
Hagiwara

(10) Patent No.: US 9,268,821 B2
(45) Date of Patent: Feb. 23, 2016

(54) DEVICE AND METHOD FOR TERM SET EXPANSION BASED ON SEMANTIC SIMILARITY

(75) Inventor: Masato Hagiwara, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/700,898

(22) PCT Filed: Feb. 22, 2012

(86) PCT No.: PCT/JP2012/054211
§ 371 (c)(1),
(2), (4) Date: Jan. 29, 2013

(87) PCT Pub. No.: WO2012/121011
PCT Pub. Date: Sep. 13, 2012

(65) Prior Publication Data
US 2013/0144875 A1 Jun. 6, 2013

(30) Foreign Application Priority Data
Mar. 4, 2011 (JP) .................................. 2011-048124

(51) Int. Cl.
*G06F 17/30* (2006.01)
*G06Q 30/06* (2012.01)

(52) U.S. Cl.
CPC ...... *G06F 17/3053* (2013.01); *G06F 17/30528* (2013.01); *G06F 17/30672* (2013.01); *G06F 17/30705* (2013.01); *G06Q 30/0601* (2013.01)

(58) Field of Classification Search
CPC .......... G06F 17/3053; G06F 17/30528; G06F 17/30672
See application file for complete search history.

(56) References Cited

U.S. PATENT DOCUMENTS 5,757,983 A 5/1998 Kawaguchi et al.
6,636,848 B1 * 10/2003 Aridor et al. ................... 707/728
(Continued)

FOREIGN PATENT DOCUMENTS

JP 4-293161 A 10/1992
JP 2009-48226 A 3/2009
(Continued)

OTHER PUBLICATIONS

Wang, Richard C. and Cohen, William W., "Language-Independent Set Expansion of Named Entities Using the Web", Language Technologies Institute Carnegie Mellon University, Proceedings of IEEE International Conference on Data Mining (ICDM 2007).
(Continued)

*Primary Examiner* — Usmaan Saeed
*Assistant Examiner* — Michael K Tamaru
(74) *Attorney, Agent, or Firm* — Sughrue Mion, PLLC

(57) ABSTRACT

A receiving unit (101) receives a seed string. A search unit (102) searches snippets of documents containing the seed string. A segment acquisition unit (103) obtains segments by partitioning the snippets using a segment partition string. A segment component acquisition unit (104) obtains segment components by partitioning the segments using a segment component partition string. A segment score computation unit (105) calculates a segment score for a segment based on the standard deviation of the lengths of the segment components. A segment component score computation unit (106) calculates a segment component score for a segment component based on the segment score and the distance between the position of the seed string and the position of the segment component. A selection unit (107) selects any of the segment components as candidates for instances contained in the expanded set of the seed string based on the segment component scores.

6 Claims, 13 Drawing Sheets

(56) References Cited

U.S. PATENT DOCUMENTS

| | | | |
|---|---|---|---|
| 6,941,297 B2 * | 9/2005 | Carmel et al. | 707/765 |
| 7,350,187 B1 | 3/2008 | Tong et al. | |
| 7,565,348 B1 * | 7/2009 | Waldin et al. | |
| 7,849,081 B1 * | 12/2010 | Chang et al. | 707/727 |
| 7,870,039 B1 | 1/2011 | Dom et al. | |
| 2004/0024739 A1 * | 2/2004 | Copperman et al. | 707/1 |
| 2005/0060150 A1 * | 3/2005 | Li et al. | 704/240 |
| 2006/0004744 A1 * | 1/2006 | Nevidomski et al. | 707/4 |
| 2008/0133488 A1 * | 6/2008 | Bandaru et al. | 707/3 |
| 2008/0177994 A1 * | 7/2008 | Mayer | 713/2 |
| 2011/0208820 A1 * | 8/2011 | Bittles et al. | 709/206 |
| 2012/0109636 A1 * | 5/2012 | Iqbal et al. | 704/9 |
| 2012/0296635 A1 * | 11/2012 | Brockett et al. | 704/9 |

FOREIGN PATENT DOCUMENTS

| | | |
|---|---|---|
| JP | 2009-110231 A | 5/2009 |
| JP | 2010-55164 A | 3/2010 |
| JP | 2010-123036 A | 6/2010 |
| JP | 2010-198269 A | 9/2010 |

OTHER PUBLICATIONS

Mamoru Komachi et al., "Graph-based Analysis of Semantic Drift in Espresso-like Bootstrapping Algorithms", Proceedings of the 2008 Conference on Empirical Methods in Natural Language Processing, 2008, pp. 1011-1020.

Masato Hagiwara et al., "Extraction of semantic categories from sentences without spaces based on graph kernels", Proceedings at the 15th Annual Conference of the Association for Natural Language Processing, 2009, pp. 697-700.

Masaya Murata et al., "Ranking Search Results based on Information Needs in conjunction with Click Log Analysis", DBSJ Journal, Mar. 27, 2009, pp. 37-42, vol. 7, No. 4.

International Search Report for PCT/JP2012/054211 dated May 22, 2012.

* cited by examiner

FIG. 4

| | 601 | 602 |
|---|---|---|
| CHINESE WOK PRESSURE COOKER | | SEARCH |

BARGAIN PRICE! APPLIANCE SHOP. CHINESE WOK PRODUCT OVERVIEW

1. TWO CHINESE WOK PRODUCTS WERE FOUND. THE FIRST TO THE SECOND PRODUCTS THEREOF ARE LISTED. A PHOTO, OR A MODEL NUMBER IS CLICKED, THEREBY YOU CAN VIEW A DETAIL PAGE. ... PASTA MACHINES, FRY PANS, ROASTERS, PRESSURE COOKERS, CHICKEN-AND-EGG CROCKPOTS, IGAYAKI, MULTI-FUNCTION PANS, CHINESE WOKS, COOKING SCISSORS, TAGINE POT, OTHER. MOREOVER PRICE IS...A 28CM LIGHTWEIGHT CHINESE WOK "PACKAGING-FREE" AA-1111, IS ON SALE FOR REGULAR PRICE 3,980 YEN...

PAN, FRY PAN, SPECIAL EDITION PRESSURE COOKER

2. TWO-HANDLED PAN/ ONE-HANDLED PAN/ PRESSURE COOKER/ GLAZED EARTHENWARE CASSEROLE DISH/ CHINESE WOK/ EARTHENWARE POT/ IH-COMPATIBLE...STAINLESS STEEL THREE-LAYER-CONSTRUCTION PRESSURE COOKER 5.5 I 8-CUP [REGULAR PRICE] 5,480 YEN...

CHINESE WOK FINISHING, PRODUCTION AREA

3. PRODUCTS SUPPLIED/RELATED KEYWORDS: CHINESE WOK, WON'T SCORCH, CHINESE WOK MATERIAL: ALUMINUM ALLOY; INTERNAL COATING...FOLLOWING PRODUCTION OF ALUMINUM ALLOY INGOTS AT EACH INSTITUTION, PRESSURE CAST ALUMINUM PANS AND VARIOUS GRILL PANS, ETC...

TWO CHINESE WOK PRODUCTS WERE FOUND. THE FIRST TO THE SECOND PRODUCTS THEREOF ARE LISTED. A PHOTO, OR A MODEL NUMBER IS CLICKED, THEREBY YOU CAN VIEW A DETAIL PAGE.

1-2

PASTA MACHINES, FRY PANS, ROASTERS, PRESSURE COOKERS, CHICKEN-AND-EGG CROCKPOTS, IGAYAKI, MULTI-FUNCTION PANS, CHINESE WOKS, COOKING SCISSORS, TAGINE POT, OTHER. MOREOVER PRICE IS 1-3

A 28 CM LIGHTWEIGHT CHINESE WOK "PACKAGING-FREE" aa-1111, IS ON SALE FOR REGULAR PRICE 3,980 YEN

FIG. 6

$P_i$      1-1P 1-1
| | |
|---|---|
| i = 1 | TWO CHINESE WOK PRODUCTS WERE FOUND |
| i = 2 | THE FIRST TO THE SECOND PRODUCTS THEREOF ARE LISTED |
| i = 3 | A PHOTO |
| i = 4 | OR A MODEL NUMBER IS CLICKED |
| i = 5 | THEREBY YOU CAN VIEW A DETAIL PAGE |

$P_i$      1-2P 1-2
| | | |
|---|---|---|
| i = 1 | PASTA MACHINES | |
| i = 2 | FRY PANS | |
| i = 3 | ROASTERS | |
| i = 4 | PRESSURE COOKERS | ← s1 |
| i = 5 | CHICKEN-AND-EGG CROCKPOTS | ← p5 |
| i = 6 | IGAYAKI | |
| i = 7 | MULTI-FUNCTION PANS | |
| i = 8 | CHINESE WOKS | ← s2 |
| i = 9 | COOKING SCISSORS | |
| i = 10 | TAGINE POT | |
| i = 11 | OTHER | |
| i = 12 | MOREOVER PRICE IS | |

$P_i$      1-3P 1-3
| | |
|---|---|
| i = 1 | A 28CM LIGHTWEIGHT CHINESE WOK |
| i = 2 | PACKAGING-FREE |
| i = 3 | aa |
| i = 4 | 1111 |
| i = 5 | IS ON SALE FOR REGULAR PRICE OF 3,980 YEN |

FIG. 7

| SNIPPET | SEGMENT | SEGMENT COMPONENT | LENGTH | STANDARD DEVIATION | SEGMENT SCORE | SEGMENT COMPONENT SCORE |
|---|---|---|---|---|---|---|
| 1 | 1-1 | P1 | 17 | 5.89 | 5.00 | 0 |
| | | P2 | 17 | | | 0 |
| | | P3 | 3 | | | 0 |
| | | P4 | 7 | | | 0 |
| | | P5 | 14 | | | 0 |
| | 1-2 | P1 | 7 | 1.34 | 1.34 | 0.09 |
| | | P2 | 5 | | | 0.20 |
| | | P3 | 5 | | | 0.45 |
| | | P4 | 3 | | | 1.00 |
| | | P5 | 3 | | | 0.45 |
| | | P6 | 3 | | | 0.20 |
| | | P7 | 5 | | | 0.45 |
| | | P8 | 3 | | | 1.00 |
| | | P9 | 5 | | | 0.45 |
| | | P10 | 3 | | | 0.20 |
| | | P11 | 3 | | | 0.09 |
| | | P12 | 5 | | | 0.04 |
| | 1-3 | P1 | 12 | 5.27 | 5.00 | 0 |
| | | : | : | | | : |
| | | P5 | 14 | | | 0 |
| 2 | : | : | : | : | : | : |
| 3 | : | : | : | : | : | : |
| : | : | : | : | : | : | : |
| 300 | : | : | : | : | : | : |

| | | SEGMENT COMPONENT SCORE | 1-2P |
|---|---|---|---|
| 1-2 | INSTANCE CANDIDATES | 1.00 | PRESSURE COOKERS |
| | | 1.00 | CHINESE WOKS |
| | | 0.45 | ROASTERS |
| | | 0.45 | CHICKEN-AND-EGG CROCKPOT |
| | | 0.45 | MULTI-FUNCTION PANS |
| | | 0.45 | COOKING SCISSORS |
| | | 0.20 | FRY PANS |
| | | 0.20 | IGAYAKI |
| | | 0.20 | TAGINE POT |
| | REMOVED SEGMENT COMPONENTS | 0.09 | PASTA MACHINES |
| | | 0.09 | OTHER |
| | | 0.04 | MOREOVER, PRICE IS |

FIG. 12

| SIMILARITY | | |
|---|---|---|
| 1.06 | PRESSURE COOKER | |
| 1.06 | CHINESE WOK | |
| 0.34 | CHICKEN-AND-EGG CROCKPOT | INSTANCES |
| 0.31 | TAGINE POT | |
| 0.12 | IGAYAKI | |
| 0.09 | MULTI-FUNCTION PAN | |
| 0.07 | FRY PAN | |
| 0.03 | COOKING SCISSORS | |
| 0.02 | ROASTER | |

INSTANCE CANDIDATES

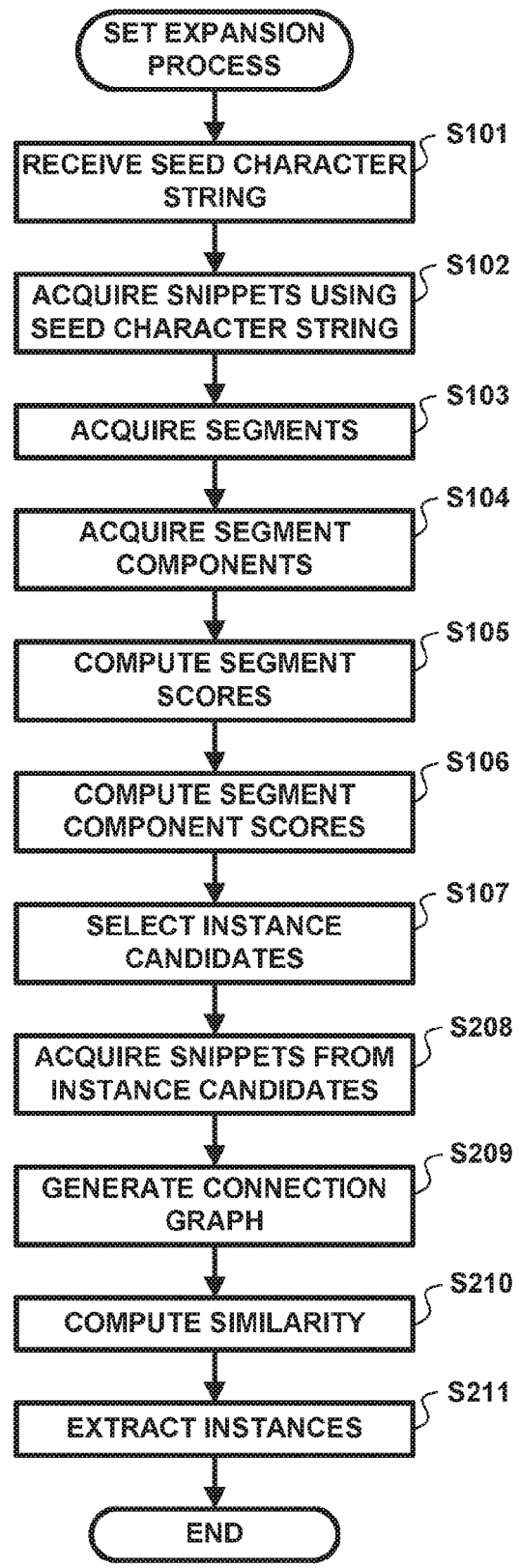

DEVICE AND METHOD FOR TERM SET EXPANSION BASED ON SEMANTIC SIMILARITY

CROSS REFERENCE TO RELATED APPLICATIONS

This application is a National Stage of International Application No. PCT/JP2012/054211 filed Feb. 22, 2012, claiming priority based on Japanese Patent Application No. 2011-048124 filed Mar. 4, 2011, the contents of all of which are incorporated herein by reference in their entirety.

TECHNICAL FIELD

The present invention relates to a set expansion processing device, set expansion processing method, program and non-transitory memory medium, and more particularly to acquisition of words contained in the same category semantically.

BACKGROUND ART

In Internet shopping, products handled by a shopping site are displayed to users divided into categories. For example, in Patent Literature 1, an information sending and receiving system for displaying product categories such as "home appliances", "books" and "computers" on pages listing products is disclosed. A user can easily narrow down products by selecting a category of products they are interested in purchasing from among these categories.

On the other hand, enormous cost is incurred in systematically building and maintaining peculiar expressions such as people's names, place names or product names. Consequently, much research has been conducted on automatic acquisition methods for automatically acquiring by computer the semantic relationship of peculiar expressions. For example, in Non-Patent Literature 1, an algorithm (called the "g-Espresso algorithm") is disclosed for extracting semantic categories from sentences with words separated by spaces. In addition, in Non-Patent Literature 2, an algorithm (called the "g-Monaka algorithm") is disclosed for extracting semantic categories from sentences in which words are not separated by spaces.

PRIOR ART LITERATURE

Patent Literature

Patent Literature 1: Unexamined Japanese Patent Application Kokai Publication No. 2009-48226

Non-Patent Literature

Non-Patent Literature 1: Mamoru Komachi, Taku Kudo, Masahi Shimbo, and Yuji Matsumoto, "Graph-based analysis of semantic drift in espresso-like bootstrapping algorithms." In Proc. of the EMNLP 2008, pp. 1011-1020, 2008.

Non-Patent Literature 2: Masato Hagiwara, Yasuhiro Ogawa and Katsuhiko Toyama, "Extraction of semantic categories from sentences without spaces based on graph kernels," Proceedings at the 15th Annual Convention of the Association for Natural Language Processing, pp. 697-700, 2009.

DISCLOSURE OF THE INVENTION

Problems to be Solved by the Invention

Because new products appear daily on shopping sites such as those mentioned above, there are times when the work of registering product categories cannot keep pace when done manually, and even with products that numerous users search, there are cases when categories to which those products belong are not set up. However, to the store it is an onerous burden to survey categories in which new products should be registered each time a new product appears, making it desirable to automatically select candidates of category in which such should be registered.

In consideration of the foregoing, it is an object of the present invention to provide a set expansion processing device, set expansion processing method, program and non-transitory recording medium well suited to selecting candidates for terms belonging to the same category semantically.

Means for Solving the Problems

The set expansion processing device according to a first aspect of the present invention comprises:

a receiver for receiving a seed string;

a searcher for searching documents containing the received seed string and obtaining snippets of the searched documents;

a segment acquirer for obtaining segments composed of strings in which strings appearing before and after the received seed strings and the seed string are arranged in order of appearance, by partitioning the obtained snippets using a predetermined segment partition string;

a segment component acquirer for obtaining segment components by partitioning each of the obtained segments using a predetermined segment component partition string;

a segment score computer for computing a segment score for each of the obtained segments based on variance or standard deviation of the respective lengths of segment components appearing in the segments;

a segment component score computer for computing a segment component score for each of the segment components contained in each of the obtained segments, based on the distance between a position in which the received seed string appears in the segment and a position at which the segment component appears in the segment, and the segment scores computed for the segments; and, a selector for selecting any of the segment components as candidates for instances contained in an expanded set that is an expansion of a set containing the received seed string, based on the computed segment component score for each of the obtained segment components.

In addition, the set expansion processing device according to the above-described aspect further comprises:

an extractor for generating a connection graph of n-grams containing the extracted instance candidates from snippets obtained by searching using the instance candidates, computing a similarity between the seed string and the instance candidates based on context before and after the received seed string and context before and after the instance candidate in the connection graph, and extracting an instance that should be contained in the expanded set that is the expansion of the set containing the seed string, from the instance candidates based on the similarity.

In addition, in the set expansion processing device according to the above-described aspect, for each of the obtained segments when the standard deviation of the length of each of the segment components appearing in that segment exceeds a predetermined threshold value, the segment score and the segment component score become values such that segment components contained in that segment are not selected by the selector as the instance candidates.

In addition, in the set expansion processing device according to the above-described aspect the segment component score of each segment component appearing in each of the obtained segments decays exponentially with respect to the shortest distance between the position where the received seed string appears in that segment and the position where the segment component appears in that segment.

The set expansion processing method according to a second aspect of the present invention is a method executed by a set expansion processing device comprising a receiver, a searcher, a segment acquirer, a segment component acquirer, a segment score computer, a segment component score computer and a selector, this method comprising:

a receiving step in which the receiver receives a seed string;

a search step in which the searcher searches documents containing the received seed string and obtains snippets of the searched documents;

a segment acquisition step in which the segment acquirer obtains segments composed of strings in which strings appearing before and after the received seed string and the seed string are arranged in order of appearance, by partitioning the obtained snippets using a predetermined segment partition string;

a segment component acquisition step in which the segment component acquirer obtains segment components by partitioning each of the obtained segments using a predetermined segment component partition string;

a segment score computation step in which the segment score computer computes segment score for each of the obtained segments based on variance or standard deviation of the respective lengths of segment components appearing in the segments;

a segment component score computation step in which the segment component score computer computes segment component score for each of the segment components contained in each of the obtained segments, based on the distance between a position in which the received seed string appears in the segment and a position at which the segment component appears in the segment, and the segment scores computed for the segments; and, a selection step in which the selector selects any of the segment components as candidates for instances contained in an expanded set that is an expansion of a set containing the received seed string, based on the computed segment component score for each of the obtained segment components.

The program according to a third aspect of the present invention causes a computer to function as:

a receiver for receiving a seed string;

a searcher for searching documents containing the received seed strings and obtaining snippets of the searched documents;

a segment acquirer for obtaining segments composed of strings in which strings appearing before and after the received seed string and the seed string are arranged in order of appearance, by partitioning the obtained snippets using a predetermined segment partition string;

a segment component acquirer for obtaining segment components by partitioning each of the obtained segments using a predetermined segment component partition string;

a segment score computer for computing segment score for each of the obtained segments based on variance or standard deviation of the respective lengths of segment components appearing in the segments;

a segment component score computer for computing segment component score for each of the segment components contained in each of the obtained segments, based on the distance between a position in which the received seed string appears in the segment and a position at which the segment component appears in the segment, and the segment scores computed for the segments; and, a selector for selecting any of the segment components as candidates for instances contained in an expanded set that is an expansion of a set containing the received seed string, based on the computed segment component score for each of the obtained segment components.

The non-transitory computer-readable recording medium according to a fourth aspect of the present invention stores a program for causing a computer to function as:

a receiver for receiving a seed string;

a searcher for searching documents containing the received seed string and obtaining snippets of the searched documents;

a segment acquirer for obtaining segments composed of strings in which strings appearing before and after the received seed string and the seed string are arranged in order of appearance, by partitioning the obtained snippets using a predetermined segment partition string;

a segment component acquirer for obtaining segment components by partitioning each of the obtained segments using a predetermined segment component partition string;

a segment score computer for computing segment score for each of the obtained segments based on variance or standard deviation of the respective lengths of segment components appearing in the segments;

a segment component score computer for computing segment component scores for each of the segment components contained in each of the obtained segments, based on the distance between a position in which the received seed string appears in the segment and a position at which the segment component appears in the segment, and the segment scores computed for the segments; and, a selector for selecting any of the segment components as candidates for instances contained in an expanded set that is an expansion of a set containing the received seed string, based on the computed segment component score for each of the obtained segment components.

The above-described program can be distributed and/or sold via a computer communication network, independent of a computer executing the program. In addition, the above-described recording medium can be distributed and/or sold independent of a computer.

Effects of the Invention

With the present invention, it is possible to provide a set expansion processing device, set expansion processing method, program and non-transitory recording medium well suited to selecting candidates for terms belonging to the same category semantically.

BRIEF DESCRIPTION OF DRAWINGS

FIG. 4 is a drawing for explaining a document that is searched;

FIG. 5 is a drawing for explaining a segment;

FIG. 6 is a drawing for explaining a segment component;

FIG. 7 is a drawing for explaining a segment score and segment component score;

FIG. 8 is a drawing for explaining selected instance candidates;

FIG. 12 is a drawing for explaining an extracted instance; and

FIG. 13 is a flowchart for explaining the set expansion process accomplished by each part of the set expansion processing device according to the second preferred embodiment.

MODE FOR CARRYING OUT THE INVENTION

Figure 1:
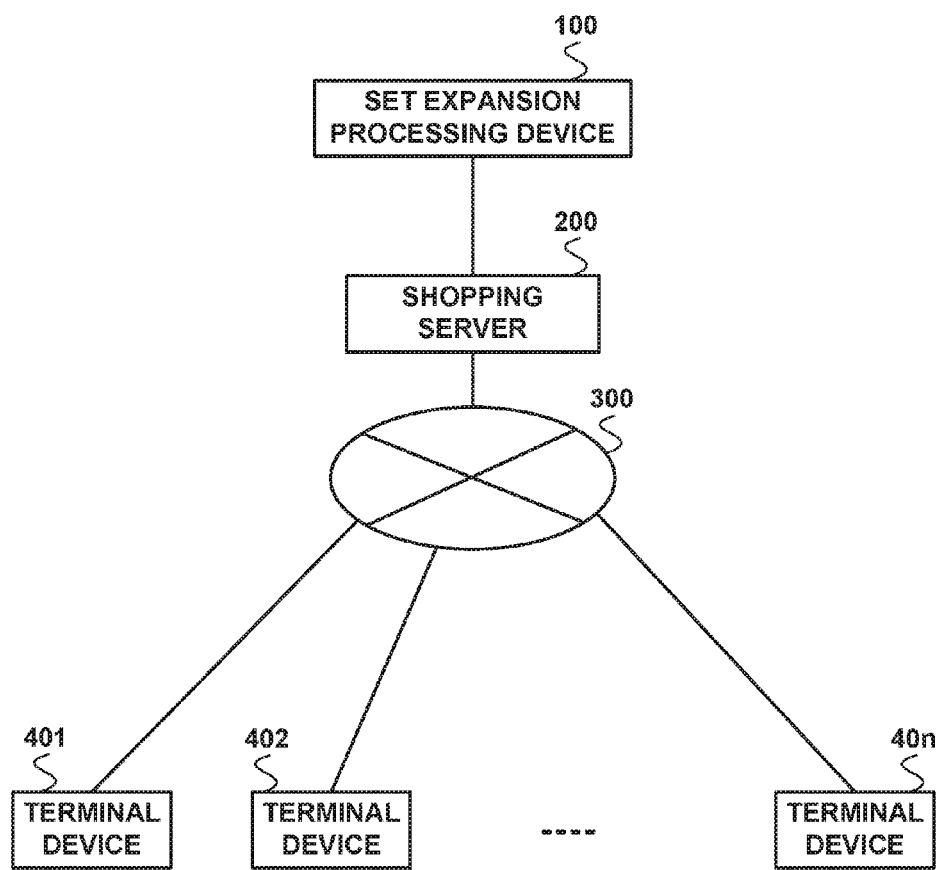
FIG. 1 is a drawing showing the relationship between a set expansion processing device according to a preferred embodiment of the present invention, and a shopping server.

A set expansion processing device 100 according to preferred embodiments of the present invention is connected to a shopping server 200, as shown in FIG. 1. The shopping server 200 is connected to the Internet 300. Multiple terminal devices 401, 402, . . . , 40n, operated by users are connected to the Internet 300. The shopping server 200 displays information about products registered on the shopping server 200 to the terminal devices 401-40n, and receives product orders from the multiple terminal devices 401-40n, via the Internet 300. In general, products registered on the shopping server 200 are displayed to users of the terminal devices 401-40n, categorized based on product type. The set expansion processing device 100 accomplishes a set expansion process for products handled by the shopping server 200 and suggests candidates for product categories.

Here, "set expansion" means being given a small number of correct sets as seeds and performing a task of acquiring sets of terms belonging to the same category semantically as the seeds. For example, when the kitchenware items "Chinese wok" and "pressure cooker" are seeds, terms belong to the same category semantically include "earthenware pot," "pour-spout saucepan," "tagine pot" and/or the like. That is to say, the set expansion processing device 100, when given "Chinese wok" and "pressure cooker" as seeds, acquires "earthenware pot," "pour-spout saucepan" and "tagine pot" as terms belong to the same category "pots" as the seeds.

Below, a typical information processing device 500 for realizing the set expansion processing device 100 according to the preferred embodiments of the present invention is described.

1. Schematic Configuration of Information Processing Device

Figure 2:
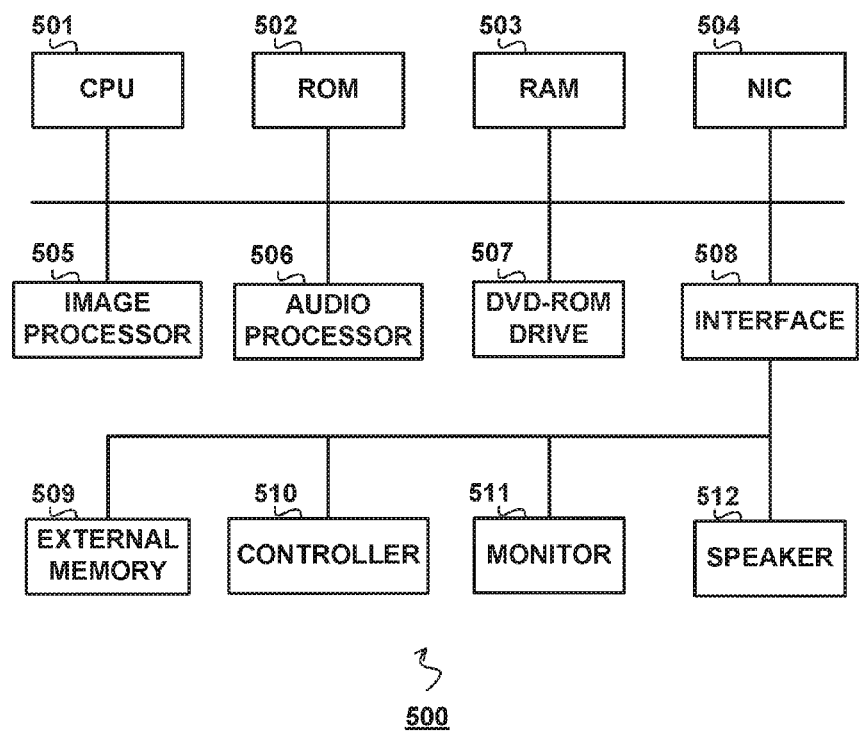
FIG. 2 is a drawing showing a schematic configuration of a typical information processing device with which the set expansion processing device according to a preferred embodiment of the present invention can be realized.

The information processing device 500 comprises a CPU (Central Processing Unit) 501, a ROM (Read only Memory) 502, a RAM (Random Access Memory) 503, a NIC (Network Interface Card) 504, an image processor 505, an audio processor 506, a DVD-ROM (Digital Versatile Disc ROM) drive 507, an interface 508, an external memory 509, a controller 510, a monitor 511 and a speaker 512, as shown in FIG. 2.

The CPU 501 controls operation of the information processing device 500 as a whole, is connected to the various constituent elements and exchanges control signals and data with such.

An IPL (Initial Program Loader) that is executed immediately after the power is turned on is recorded in the ROM 502, and by this being executed a predetermined program is read out of the RAM 503 and execution of that program is started by the CPU 501. In addition, various data and an operating system program necessary for controlling the actions of the information processing device 500 as a whole are recorded in the ROM 502.

The RAM 503 is used for temporarily storing data and programs and stores programs and data read from the DVD-ROM as well as data necessary for communications.

The NIC 504 is used for connecting the information processing device 500 to a computer communication network such as the Internet 300 and is composed of, for example, what is in compliance with a 10BASE-T/100BASE-T standard used for establishing a LAN (local area network), an analog modem for connecting to the Internet through a phone line, an ISDN (integrated services digital network) modem, an ADSL (asymmetric digital subscriber line) modem, a cable modem for connecting to the Internet through a cable television circuit and/or the like, as well as an interface (unrepresented) intermediating between any of them and the CPU 501.

The image processor 505 records data read from a DVD-ROM and/or the like in a frame memory (unrepresented) provided in the image processor 505 after such has been processed by the CPU 501 and an image computation processor (unrepresented) provided in the image processor 505. The image information recorded in the frame memory is converted into a video signal at a predetermined synchronization timing and is output to the monitor 511. Through this, various types of page displays become possible.

The audio processor 506 converts audio data read from a DVD-ROM and/or the like into an analog audio signal and outputs such from a speaker 512 connected thereto. In addition, under the control of the CPU 501, this processor generates sounds that should be emitted during progress in processes accomplished by the information processing device 500, and outputs audio corresponding thereto from the speaker 512.

The DVD-ROM loaded into the DVD-ROM drive 507 for example may have recorded thereon a program for realizing the set expansion processing device 100 according to the preferred embodiments. Through control by the CPU 501, the DVD-ROM drive 507 accomplishes the process of reading the DVD-ROM that was loaded, reading necessary programs and data and temporarily storing such in the RAM 503 and/or the like.

The external memory 509, the controller 510, the monitor 511 and the speaker 512 are removably connected to the interface 508.

Data relating to personal information of the user and/or the like is overwritably stored in the external memory 509.

The controller 510 receives operation input accomplished at various setting times of the information processing device 500. The user of the information processing device 500 can store such data in the appropriate external memory 509 by accomplishing instruction input via the controller 510.

The monitor 511 presents to the user of the information processing device 500 data output by the image processor 505.

The speaker 512 presents to the user of the information processing device 500 audio data output by the audio processor 506.

Besides this, the information processing device 500 may be composed to achieve the same functions as the ROM 502, RAM 503, external memory 509, DVD-ROM loaded in the DVD-ROM drive 507 and/or the like, using a large-capacity external memory device such as a hard disk.

Below, the schematic configuration of the set expansion processing device 100 according to the preferred embodiments realized in the above-described information processing device 500 is explained with reference to FIGS. 1 to 13. By turning on the power supply of the information processing device 500, a program that functions as the set expansion processing device 100 according to the preferred embodiments is executed and the set expansion processing device 100 according to the preferred embodiments is realized.

2. Schematic Configuration of Set Expansion Device According to a First Preferred Embodiment The set expansion processing device 100 according to a first preferred embodiment selects candidate of an instance contained in an expanded set which is an expansion of a set containing seed string.

Figure 3:
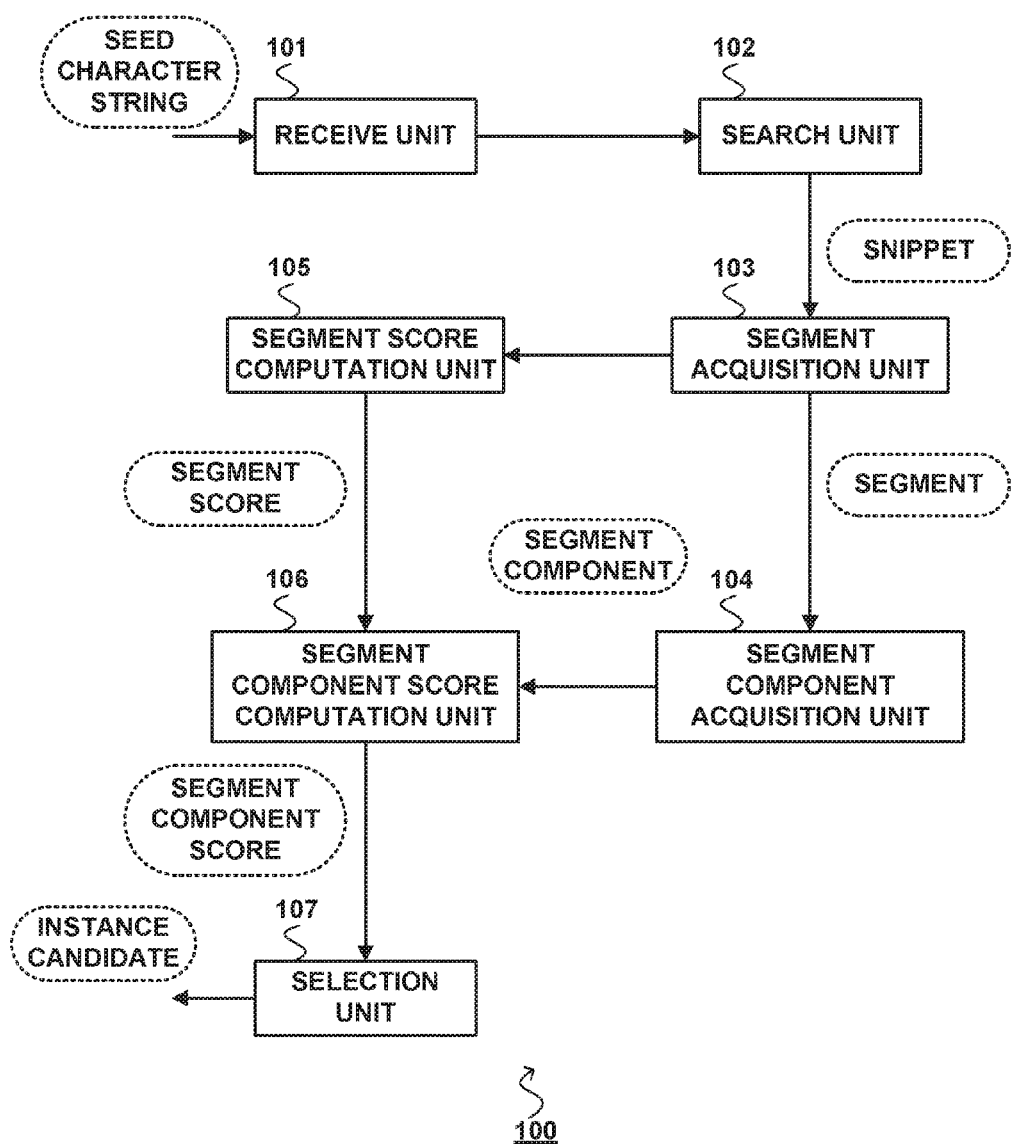
FIG. 3 is a drawing for explaining the schematic configuration of a set expansion processing device according to a first preferred embodiment.
Figure 9:
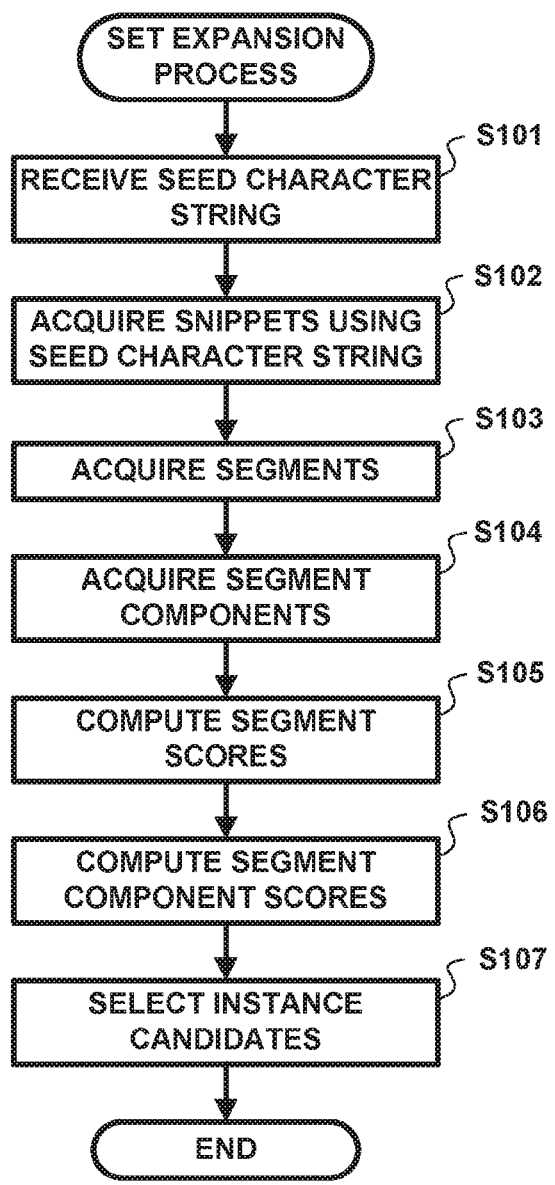
FIG. 9 is a flowchart for explaining the set expansion process accomplished by each part of the set expansion processing device according to the first preferred embodiment.

The set expansion processing device 100 according to this preferred embodiment is composed of a receive unit 101, a search unit 102, a segment acquisition unit 103, a segment component acquisition unit 104, a segment score computation unit 105, a segment component score computation unit 106 and a selection unit 107, as shown in FIG. 3.

The explanation below uses as an example a case in which the set expansion processing device 100 accomplishes display of a suitable term (instance) candidate as a term belonging to the pot category of kitchen products.

The receive unit 101 receives a seed string. The seed string is, for example, a correct term ("Chinese wok" or "pressure cooker" and/or the like) contained in the set of terms belonging to the "pot" category. For example, as shown in FIG. 4, the user inputs the all of the seed strings linked by spaces into a search field 601 of a search engine on a Web page, and pressed a search button 602. In this case, the receive unit 101 receives "Chinese wok" and "pressure cooker" input into the search field 601 as the seed strings. The type of search engine is arbitrary.

With this preferred embodiment, the CPU 501 and the controller 510 work together to function as the receive unit 101.

The search unit 102 searches documents containing the received seed string and obtains snippets. Here, a snippet is, for example, a portion of text containing the query displayed as search results when the search engine of the Web page is used. The search unit 102 obtains a list of the top 300 snippets, for example, from search results when all of the seed strings linked with spaces are input as a query into the search engine of the Web page. For example, the search unit 102 accomplishes a Web page search using the search engine with "Chinese wok pressure cooker" as the query, and obtains snippets 1, 2, 3, . . . , 300 (unrepresented) of FIG. 4 containing the given seed strings "Chinese wok" and "pressure cooker." The search unit 102 is not limited to obtaining documents using an external device as described above, and may be provided with a search function internally. For example, the search unit 102 may obtain snippets using a Web search API.

In this preferred embodiment, the CPU 501 and the NIC 504 work together to function as the search unit 102.

The segment acquisition unit 103 obtains segments composed of strings arranged in order of appearance of the seed string and strings appearing before and after the seed string, by partitioning the obtained snippets using a predetermined segment partition string. The snippets are typically partitioned by a predetermined partition string so that in the page containing search terms, the user can tell at a glance how these search terms were used. For example, suppose the predetermined segment partition string is " . . . ". For example, the segment acquisition unit 103 standardizes the obtained snippets 1, 2, 3, . . . , 300 using Unicode NFKC, makes these uniformly lower case, and divides into the multiple strings by the segment partition string " . . . ". Furthermore, the segment acquisition unit 103 excludes redundant strings out of the divided strings, and obtains the remaining strings as segments. By making the obtained snippets uniformly lower case, it is possible to deal with cases in which the model number string, for example, is not uniformly upper case or lower case. FIG. 5 shows segments 1-1 to 1-3 obtained by the segment acquisition unit 103 from the snippet 1.

The segment partition string is not limited to the string " . . . ". When the snippets displayed by the Web engine used by the search unit 102 or the Web search API are partitioned by the string " - - - " or "##", for example, the segment partition string becomes the string " - - - " or "##". In addition, the method of obtaining the segments is not limited to a method of obtaining segments using segment partition strings. Segments are appropriately obtained in accordance with snippets presented by the search engine or Web search API used. For example, when one snippet is presented without being partitioned by symbols such as " . . . ", that snippet becomes one segment. In addition, when a portion corresponding to a segment within a snippet is presented by itemization and/or the like in advance, the portion corresponding to one row of the itemization becomes one segment.

In this preferred embodiment, the CPU 501 functions as the segment acquisition unit 103.

The segment component acquisition unit 104 obtains segment elements by partitioning the respective segments obtained using a predetermined segment component partition string. For example, the predetermined segment component partition string is punctuation or symbols (",", "," (Japanese punctuation mark), ",", ".", "!", "[", "]" and/or the like), and the segment is partitioned by these segment component partition strings, and then segment components are obtained. For example, when the segment component acquisition unit 104 partitions the segments 1-1, 1-2 and 1-3 in FIG. 5 using a segment component partition string, the segment component groups 1-1P (segment component $P_i$ (i=1-5)), 1-2P (segment component $P_i$ (i=1-12)) and 1-3P (segment component $P_i$ (i=1-5)) of FIG. 6 are obtained.

In this preferred embodiment, the CPU 501 functions as the segment component acquisition unit 104.

The segment score computation unit 105 computes a segment score for each of the obtained segments based on the standard deviation or variance of the length of each of the segment components appearing in that segment. For each of the obtained segments, when the standard deviation of the length of each of the segment components appearing in that segment exceeds a predetermined threshold value, the segment score and the below-described segment component score are values such that the segment components contained in that segment are not selected by the selection unit 107 as instance candidates. In this preferred embodiment, the length of a segment component is defined by the number of characters (Japanese characters of Japanese translation for the segment component) in Unicode, but this is intended to be illustrative and not limiting. For example, as the length of a segment component it is possible to use the byte number of another character code.

For example, as shown in FIG. 5 the segments 1-1 and 1-3 contain normal text but the segment 1-2 does not contain normal text. And, the variation in the length of segment components contained in the segments 1-1 and 1-3 is larger than the variation in the length of segment components contained in the segment 1-2. In other words, segments containing normal text in general tend to have lengths of segment components contained in that segment that are not as uniform as those of segments not containing normal text. Furthermore, segments containing normal text often do not contain instances belonging to the same contextual range as the seed string, and thus are not suitable as segments for obtaining instance candidates. Accordingly, segments in which the standard deviation of the length of segment components exceeds a predetermined threshold value are excluded below from segments for obtaining instance candidates.

In this preferred embodiment, the predetermined threshold value is 5.00. In addition, the segment score computation unit 105 uses the value of the standard deviation itself as the segment score when the standard deviation of the lengths of segment components is less than 5.00, and sets the segment score at 5.00 when the standard deviation is at least 5.00.

FIG. 7 shows segment scores computed by the segment score computation unit 105. In the table in FIG. 7, "snippet 701*a*" obtained with the seed string as a query, "segment 702*a*" contained in the snippet 701*a*, "segment component 703*a*" contained in the segment 702*a*, "length 704*a* (length of Japanese characters)" of the segment component 703*a*, "standard deviation 705*a*" of the length 704*a*, "segment score 706*a*" computed based on the standard deviation 705*a*, and "segment component score 707*a*" computed by the below-described segment component score computation unit 106 are recorded associated with each other.

For example, the segment score computation unit 105 finds the lengths of the segment components $P_i$ (i=1-5) contained in the segment 1-1, the segment components $P_i$ (i=1-12) contained in the segment 1-2, and the segment components $P_i$ (i=1-5) contained in the segment 1-3, as shown in column 704*a* of FIG. 7. Furthermore, the segment score computation unit 105 finds "5.89" as the standard deviation of the lengths of the segment components $P_i$ (i=1-5) contained in the segment 1-1, "1.34" as the standard deviation of the lengths of the segment components $P_i$ (i=1-12) contained in the segment 1-2, and "5.27" as the standard deviation of the lengths of the segment components $P_i$ (i=1-5) contained in the segment 1-3, as shown in column 705*a* of FIG. 7. Accordingly, the segment score computation unit 105 finds "5.00" as the segment score of the segment 1-1, "1.34" as the segment score of the segment 1-2 and "5.00" as the segment score of the segment 1-3, as shown in column 706*a* of FIG. 7.

In this preferred embodiment, the CPU 501 functions as the segment score computation unit 105.

The segment component score computation unit 106 computes segment component scores for each of the segment components contained in each of the obtained segments based on the distance between the position where the received seed string appears in the segment and the position where that segment component appears in the segment, and the segment score computed for that segment.

For example, suppose that when the standard deviation of the lengths of the segment components exceeds a predetermined threshold value the segment component score is set to a value such that the segment component is not selected by the selection unit 107 as an instance candidate, as described above. For example, suppose that the segment component score computation unit 106 sets the segment component score to "0" when the segment score is "5.00". On the other hand, when the segment score is less than "5.00", the segment component score computation unit 106 computes the segment component score based on the distance between the position where the received seed string appears in the segment and the position where that segment component appears in that segment. Here, a position $s_j$ (j: number of the seed string) where the seed string appears in the segment, and a position $p_i$ where the segment component appears in that segment are in appearance order in the segment when the segment components are arranged in appearance order in the segment, as shown in FIG. 6, and the distance is the difference in appearance order between the position $s_j$ and the position $p_i$. That is to say, taking the seed strings to be "Chinese wok" and "pressure cooker", the position $s_1$ where the seed string "pressure cooker" ($P_4$) appears in the segment 1-2 is "4", and the position $s_2$ where the seed string "Chinese wok" ($P_8$) appears in is "8". In addition, the position $p_5$ where the segment component "crockpot for chicken and eggs" ($P_5$) appears in the segment 1-2 is "5" and the distance between the seed string "Chinese wok" ($P_8$) and the segment component "crockpot for chicken and eggs" ($P_5$) is 3.

Furthermore, the segment component score computation unit 106 computes the segment component score $S_i$ based on the below equation (Formula 1) from the positions $s_j$ where the seed strings appear in the segment and the positions $p_i$ where the segment components appear in the segment. With this equation (Formula 1), the score that decays exponentially in accordance with distance to the closest seed string is taken as the segment component score of each segment component. In this preferred embodiment, α=0.8. Computation results are shown in the segment component score column 707*a* in FIG. 7.

$$S_i = \max_j \exp(-\alpha |p_i - s_j|) \qquad \text{[Formula 1]}$$

In the above description, a score that decays exponentially in accordance with distance to the closest seed string is found, but a variety of variations on the method of finding the score are possible. For example, when multiple seed strings exist, the distances between each seed string and the segment component may each be found, and a score that decays linearly in accordance with the average value of the distances found may be taken as the segment component score of each segment component.

Above, one example of a case in which seed strings appear in a segment was described, and case in which term similar to the seed string appear can be computed similarly. Specifically, when "Chinese wok (Japanese kanji character)" and "pressure cooker (Japanese kanji character)" are the seed string, when a search is accomplished with the search unit using term similar to the seed string in addition to the seed string, snippets containing term similar to the seed strings such as "Chinese wok (Japanese hiragana character)" and "pressure cooker (Japanese hiragana character)" are obtained. In this kind of case, by using a commonly known Chinese character/phonetic character conversion program and/or the like, it is possible to similarly treat the term similar to the seed string as seed string in the segment component score computation unit 106. In this way, even when term similar to seed string appear in a segment, it is possible to compute the segment component score $S_i$ in accordance with Formula 1.

In this preferred embodiment, the CPU 501 functions as the segment component score computation unit 106.

The selection unit 107 selects any of the obtained segment components as instance candidates contained in the expanded set that is an expansion of a set containing the seed string received, based on the segment component score computed for each of those segment components. Here, the expanded set is a set obtained after implementing the set expansion process, and is a set of terms contained in a category semantically the same as the seed string. For example, the selection unit 107 excludes from instance candidates segment components whose segment component score value is less than "0.10", and selects the remaining segment components as instance candidates. That is to say, the selection unit excludes from candidates segment components obtained from the segments 1-1 and 1-3 because the segment component scores of the segment components obtained from the segments 1-1 and 1-3 are all "0" (FIG. 7). Furthermore, as shown in FIG. 8, out of the segment components obtained from the segment 1-2, the selection unit 107 excludes the "pasta machine," "other" and "furthermore the price is" segment components, whose segment component scores are less than "0.10," and selects the remaining segment components as instance candidates contained in the semantically same category as "Chinese wok" and "pressure cooker." In this preferred embodiment, a method of selecting instance candidates was explained using a single snippet as an example, but in reality segments components are obtained from multiple snippets, segment component scores are found and instance candidates are selected. In this case, segment component scores are respectively found from different snippets in the same segment component. In particular, segment components contained in the semantically same category as the seed string are thought to be contained in multiple snippets, so the probability of multiple segment component scores being obtained is high. Accordingly, when multiple segment component scores are obtained, the sum or maximum value thereof becomes the segment component score of that segment component. By processing in this manner, it is possible to select more appropriate instance candidates.

In this preferred embodiment, the CPU 501 functions as the selection unit 107.

3. Action of the Set Expansion Processing Device of the First Preferred Embodiment Next, the actions performed by each part of the set expansion processing device 100 of this preferred embodiment are described with reference to the flowchart in FIG. 9. When the power supply of the set expansion processing device 100 is turned on and a predetermined operation is accomplished, the CPU 501 starts the set expansion process shown in the flowchart of FIG. 9.

First, the receive unit 101 receives seed string (step S101). For example, the receive unit 101 receives as seed strings "Chinese wok" and "pressure cooker" input as queries into the search field 601 of the Web page's search engine, as shown in FIG. 4.

Next, the search unit 102 searches documents containing the received seed string and obtains snippets (step S102). For example, the search unit 102 searches the seed strings "Chinese wok" and "pressure cooker" as queries and obtains the top 300 snippets 1, 2, 3, . . . , 300 of the search results, as shown in FIG. 4. The number of snippets the search unit 102 obtains is arbitrary but by obtaining at least 100 or so snippets, it is possible to select more suitable instance candidates.

Next, the segment acquisition unit 103 obtains segments by using a segment partition string to partition the snippets obtained by the search unit 102 (step S103). For example, the segment acquisition unit 103 obtains segments by partitioning the snippets 1, 2, 3, . . . , 300 using the segment partition string " . . . ". For example, the segment acquisition unit 103 obtains the segments 1-1 to 1-3 from the snippet 1, as shown in FIG. 5.

When segments are obtained (step S103), the segment component acquisition unit 104 obtains segment components by partitioning those segments using predetermined segment component partition string (step S104). For example, the segments 1-1 to 1-3 are partitioned using segment component partition strings ("," (Japanese punctuation mark), ",", ".", "!", "[", "]" and/or the like) to obtain the segment components (segment component groups 1-1P, 1-2P, 1-3P) of FIG. 6.

When the segment components are obtained (step S104), the segment score computation unit 105 computes the segment scores of each of those segments based on the standard deviation of the lengths of the segment components contained in the segment (step S105). For example, when the standard deviation of the lengths of the segment components is less than 5.00, the segment score computation unit 105 sets the value of the standard deviation as the segment score, and when the standard deviation of the lengths of the segment components is at least 5.00, sets 5.00 as the segment score. That is to say, the segment score computation unit 105 sets "5.00" as the segment score of the segment 1-1 having a standard deviation of "5.89," sets "1.34" as the segment score of the segment 1-2 having a standard deviation of '1.34," and sets "5.00" as the segment score of the segment 1-3 having a standard device of "5.27".

Next, the segment component score computation unit 106 computes the segment component scores of the segment components based on the distance between the position where the received seed string appears in the segment and the position where that segment component appears in that segment, and the segment score computed for that segment (step S106). For example, the segment component score computation unit 106 sets "0" as the segment component score when the segment score is "5.00", and when the segment score is less than "5.00," computes the segment component score 707a (FIG. 7) based on an equation (Formula 1) using the distance between the position where the seed string appears in the segment and the position where the segment component appears in the segment.

Furthermore, the selection unit 107 selects instance candidates belonging to the semantically same category as the seed string based on the segment component scores for the obtained segment components (step S107). For example, the selection unit 107 selects as instance candidates segment components whose segment component score value is at least "0.10", as shown in FIG. 8.

With this preferred embodiment, "crockpot for chicken and eggs" and "tagine pot" are terms contained in the same "pot" category as the seed strings "Chinese wok" and "pressure cooker," so it is possible to select these as candidates for terms belonging to the semantically same category.

4. Schematic Configuration of a Set Expansion Processing Device According to a Second Preferred Embodiment The set expansion processing device 100 of a second preferred embodiment removes semantically unrelated terms by applying a filter based on context for instance candidates contained in the expanded set.

Figure 10:
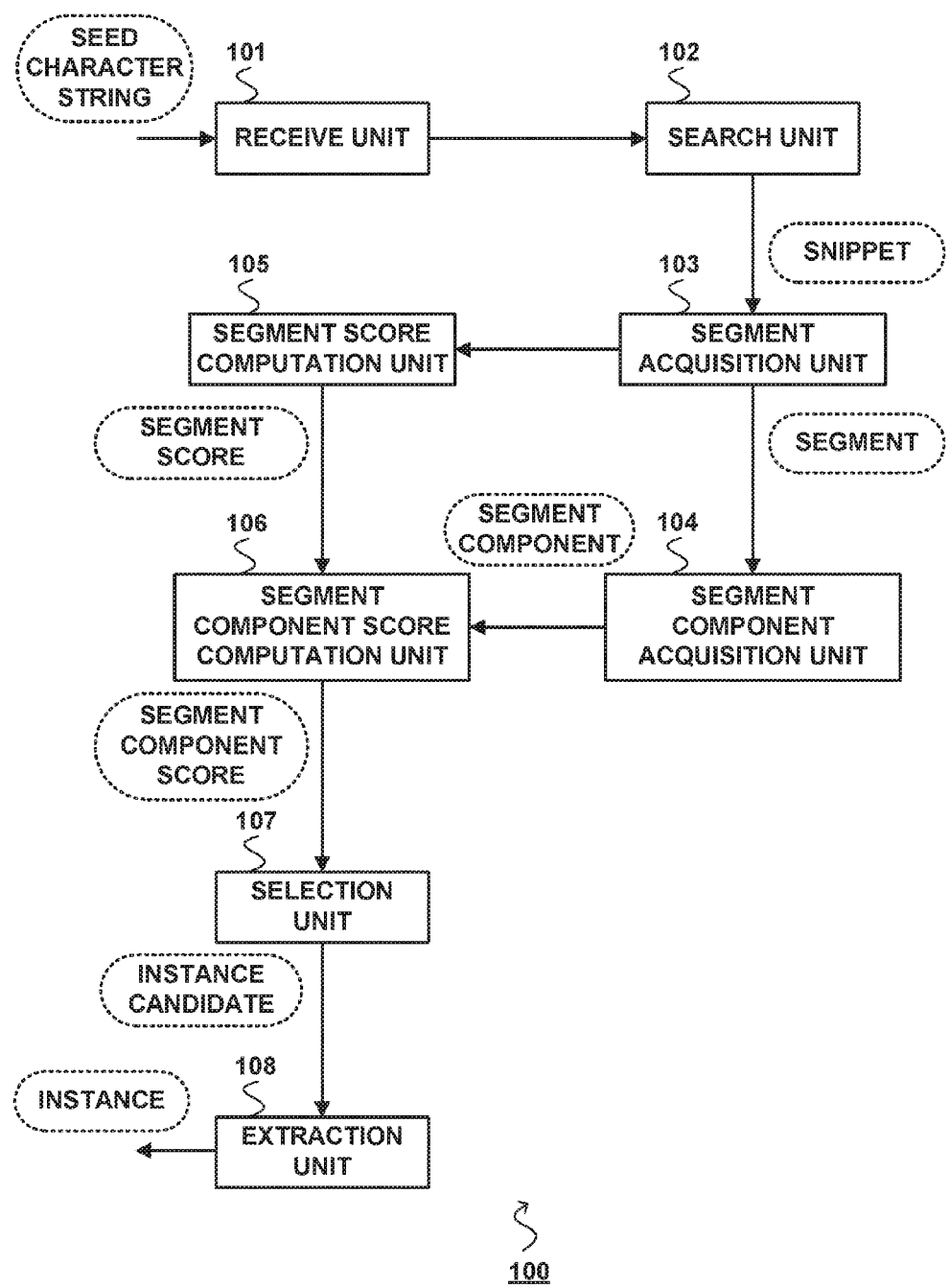
FIG. 10 is a drawing for explaining the schematic configuration of a set expansion processing device according to a second preferred embodiment.

The set expansion processing device 100 according to this preferred embodiment is composed of a receive unit 101, a search unit 102, a segment acquisition unit 103, a segment component acquisition unit 104, a segment score computation unit 105, a segment component score computation unit 106, a selection unit 107 and an extraction unit 108, as shown in FIG. 10. The receive unit 101, the search unit 102, the segment acquisition unit 103, the segment component acquisition unit 104, the segment score computation unit 105, the segment component score computation unit 106 and the selection unit 107 have the same functions as in the first preferred embodiment. Below, the extraction unit 108, which has a different function, is described.

First, instance candidates are considered to be semantically similar to seed string to the extent that the context before and after the seed string and the context before and after the instance candidate are similar. Hence, the set expansion processing device 100 of the second preferred embodiment finds the similarity between the seed string and the instance candidate based on the context before and after the seed string and the context before and after the instance candidate, and extracts instances from among the instance candidates based on that similarity. Through this, it is possible to remove semantically unrelated terms. Below, the set expansion device 100 ranks instance candidates from similarity computed based on the g-Monaka algorithm, and extracts as instances those having a similarity at least as great as a threshold value. The method of finding the similarity is not limited to the g-Monaka algorithm. For example, the g-Espresso algorithm may be used.

The extraction unit 108 generates a connection graph of the n-gram containing the extracted instance candidates, from snippets obtained through searches using the instance candidates. Furthermore, the extraction unit 108 computes the similarity between the received seed string and that instance based on the context before and after the seed string and the context before and after the instance candidate in that connection graph, and extracts an instance that should be contained in an expanded set that is an expansion of the set including those seed string, from those instance candidates, based on that similarity. Below, the method of computing the similarity based on the g-Monaka algorithm is explained in detail.

The extraction unit 108 obtains a list of the top 300 snippets in the search results by inputting the respective instance candidates selected by the selection unit 107 as queries in the Web page's search engine. Furthermore, the extraction unit 108 standardizes the obtained snippets through Unicode NFKC, makes everything lower case and removes redundancies. In addition, when the percentage of Japanese characters is extremely low and there are numerous symbols, the snippet is excluded as inappropriate.

Next, the extraction unit 108 builds a connection matrix M(u,v) for all text n-grams contained in the remaining snippet set. The connection matrix M(u,v) is expressed by an equation (Formula 2).

$$M(u, v) = \frac{pmi(u, v)}{\max pmi}, \; pmi(u, v) = \log\frac{|u, v|}{|u, *| * |*, v|} \quad \text{(Formula 2)}$$

Here, |u,v| is the frequency of an n-gram v following an n-gram u, and |u,*| and |*,v| are respectively the appearance frequencies of the n-gram u and the n-gram v. In this preferred embodiment, |u,v|, |u,*|, and |*,v| are search result numbers when each is searched as a query, and pmi (u,v) uses the natural logarithm of that search result number.

Figure 11:
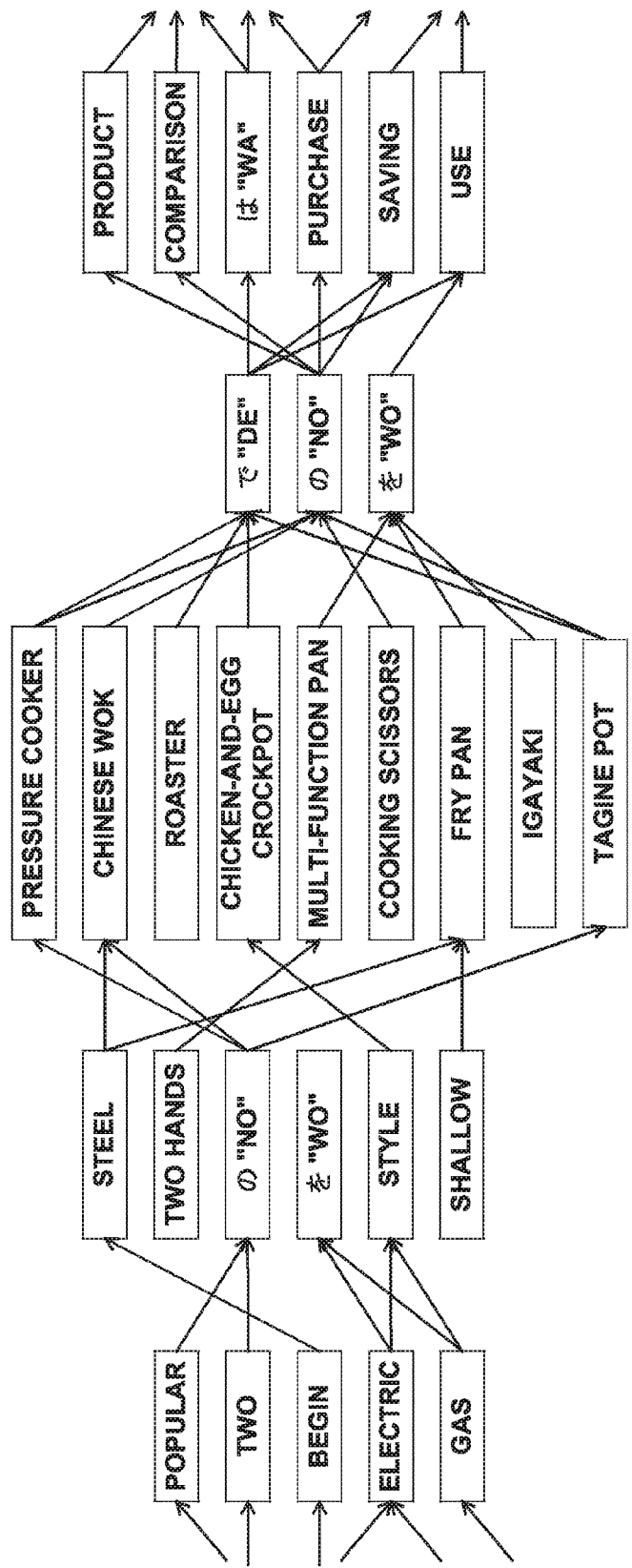
FIG. 11 is a drawing for explaining a connection graph.

Next, the extraction unit 108 generates a directed weighted graph (hereafter called the "connection graph") $G_M$ expressed with M as the connection matrix and the set V of all n-grams as the node set. An example of the generated connection graph $G_M$ is shown in FIG. 11. In this graph, it is possible to consider the meanings of the n-gram u and the n-gram v to be similar to the extent that the right-side context and the left-side context of the n-gram u and the n-gram v are similar.

First, whether or not the right-side context of the n-gram u and the right-side context of the n-gram v are similar can be thought of as corresponding to a concept of the bibliographic coupling of the citation analysis method. A bibliographic coupling means that documents x and y cite the same document. That is to say, the bibliographic coupling can be thought of as corresponding to whether or not the n-gram u and the n-gram v are connected to the same n-gram. On the other hand, whether or not the left-side context of the n-gram u and the left-side context of the n-gram v are similar can be thought of as corresponding to the concept of co-citation of the citation analysis method. Co-citation means that documents x and y are cited by the same document. That is to say, this can be thought of as corresponding to whether or not the same n-gram is connected to the n-gram u and the n-gram v.

Accordingly, the similarity matrices $A_R$ and $A_L$ indicating whether or not the left-side context and the right-side context of the n-gram u and the n-gram v are similar are found by corresponding each to the bibliographic coupling matrix and the co-citation matrix. The right-side context similarity matrix $A_R$ and the left-side context similarity matrix $A_L$ can be expressed by an equation (Formula 3) using the connection matrix M.

$$A_R = \frac{1}{|V|^2} MM^T, \; A_L = \frac{1}{|V|^2} M^T M \quad \text{[Formula 3]}$$

The extraction unit 108 finds the right-side context similarity matrix $A_R$ and the left-side context similarity matrix $A_L$ for all of the n-grams.

In addition, in order to consider the n-gram u and the n-gram v to be semantically similar, it is necessary for both the right-side context and the left-side context to be similar (hereafter called the "dual-side adjacency constraint"). Hence, as shown in an equation (Formula 4), the extraction unit 108 finds the similarity matrix A indicating the similarity of the n-gram u and the n-gram v by a weighted general average of each component. Here, m is a parameter that regulates the strength of this dual-side adjacency constraint, and in this preferred embodiment, m=0.1.

$$A(i, j) = \sqrt[m]{\frac{1}{2}(A_R(i, j)^m + A_L(i, j)^m)} \quad \text{(Formula 4)}$$

Furthermore, the extraction unit 108 finds the Laplacian kernel $R_\beta(A)$ from the equations of Formula 5 and Formula 6, using this similarity matrix A.

$$\tilde{R}_\beta(A) = \sum_{n=0}^{\infty} \beta^n(-\tilde{L}) \quad \text{(Formula 5)}$$

$$\tilde{L} = I - D^{-\frac{1}{2}} A D^{-\frac{1}{2}}, \; D(i, j) = \sum_j A(i, j) \quad \text{(Formula 6)}$$

The element (i,j) in $R_\beta(A)$ corresponds to the similarity between the n-gram i and the n-gram j. The extraction unit 108 computes $R_\beta(A)v_0$ using a seed vector $v_0$ (a vector in which the element corresponding to the seed string is 1 and all others are 0), and the computed value is the similarity. The value of β is arbitrary and for example is 1.0 to 2.

For example, in the connection graph $G_M$ of FIG. 11, "Chinese wok" is connected to the particle "NO" (Japanese particle), and "cooking scissors" and "tagine pot" are both connected to the particle "no". In addition, the "no" connected to "Chinese wok" is connected to "tagine pot", but the "NO" is not connected to "cooking scissors". In this kind of case, the similarity $R_\beta(A)v_0$ of "cooking scissors" to "Chinese wok" is a smaller value than the similarity $R_\beta(A)v_0$ of "tagine pot" to "Chinese wok".

The extraction unit 108 for example extracts as instances those whose computed similarity exceeds a predetermined value. For example, the similarity is found as in FIG. 12, and when the predetermined value is "0.10", the extraction unit 108 extracts as instances "pressure cooker", "Chinese wok", "crockpot for chicken and eggs", "tagine pot", and "igayaki".

In this preferred embodiment, the CPU 501 functions as the extraction unit 108.

5. Actions of the Set Expansion Processing Device of the Second Preferred Embodiment Next, the actions performed by each part of the set expansion processing device 100 of this preferred embodiment are described with reference to the flowchart in FIG. 13. When the power supply of the set expansion processing device 100 is turned on and a predetermined operation is accomplished, the CPU 501 starts the set expansion process shown in the flowchart in FIG. 13. In the flowchart in FIG. 13, steps labeled with the same step numbers as in the flowchart in FIG. 9 accomplish the same processes as the processes in the flowchart in FIG. 9. Accordingly, explanation of such is omitted here.

When instance candidates are selected by the selection unit 107 (step S107), the extraction unit 108 acquires snippets by searching with a search engine using the instance candidates (step S208). For example, the extraction unit 108 inputs the instance candidates as queries into the Web page's search engine and obtains a list of the top 300 snippets of the search results.

Next, the extraction unit 108 generates a connection graph of n-grams containing instance candidates from the obtained snippets (step S209). For example, the extraction unit 108 removes inappropriate items from the 300 snippets and finds a connection matrix M for the n-grams of all text contained in the set of remaining snippets. Furthermore, as shown in FIG. 11, the set V of all n-grams is made the node set and a connection graph $G_M$ expressing M (Formula 2) as a connection matrix is generated.

The extraction unit 108 computes the similarity between the seed string and the instance candidate based on the context before and after the seed string and the context before and after the instance candidate in the connection graph (step S210). For example, the extraction unit 108 finds the right-side context similarity matrix $A_R$ and the left-side context similarity matrix $A_L$ based on the equation (Formula 3), and finds the similarity matrix A using a weighted general average of each component, as shown in the equation (Formula 4). Furthermore, the Laplacian kernel $R_\beta(A)$ is found using the similarity matrix A based on the equations (Formulae 5 and 6), and the similarity of the instance candidates to the seed string is found by multiplying by the seed vector $v_0$.

The extraction unit 108 extracts instances based on similarity (step S211). For example, the extraction unit 108 extracts as instances those with a computed similarity exceeding "0.10", as shown in FIG. 12. Or, the extraction unit 108 may extract only a predetermined number from those with high similarities. For example, when there are nine instance candidates as shown in FIG. 12, when the predetermined number is four the extraction unit 108 extracts as instances the top four in terms of similarity, namely "pressure cooker", "Chinese wok", "crockpot for chicken and eggs" and "tagine pot".

With this preferred embodiment, it is possible to remove semantically unrelated terms, so it is possible to extract more appropriate terms deemed to be contained in the semantically same category.

In the first and second preferred embodiments, the set expansion processing device 100 was exhibited using an example applied to category generation for shopping site products, but this is intended to be illustrative and not limiting. For example, the present invention can also be applied to unique expression acquisition or dictionary building and/or the like.

This application claims the benefit of Japanese Patent Application 2011-048124, filed 4 Mar. 2011, the entire disclosure of which is incorporated by reference herein.

INDUSTRIAL APPLICABILITY

With the present invention, it is possible to provide a set expansion processing device, set expansion processing method, program and non-transitory recording medium well suited to selecting candidates for terms belonging to the same category semantically.

DESCRIPTION OF REFERENCE NUMERALS

100 Set expansion processing device
101 Receive unit
102 Search unit
103 Segment acquisition unit
104 Segment component acquisition unit
105 Segment score computation unit
106 Segment component score computation unit
107 Selection unit
108 Extraction unit
200 Shopping server
300 Internet
401, 402, ..., 40n Terminal devices
500 Information processing device
501 CPU
503 RAM
504 NIC
505 Image processor
506 Audio processor
507 DVD-ROM drive
508 Interface
509 External memory
510 Controller
511 Monitor
512 Speaker
601 Search field
602 Search button

The invention claimed is:

1. A set expansion processing device comprising:
a receiver for receiving a seed string from a user;
a searcher for ordering a search engine to search, with the seed string, a first set of documents containing the seed string and generate snippets from the first set of documents received from the search engine;
a segment acquirer for generating segments composed of strings by partitioning the generated snippets, including the seed string, using one or more predetermined segment partition strings, wherein the strings composing the segments are arranged in order of appearance;
a segment component acquirer for generating segment components by partitioning each of the generated segments using one or more predetermined segment component partition strings;

a segment score computer for computing a segment score for each of the generated segments based on the variance or the standard deviation from the mean value of the lengths of the segment components appearing in their corresponding segments;

a segment component score computer for computing a segment component score for each of the segment components contained in each of the generated segments, based on a distance between the position of the seed string and the position of each corresponding segment component in the segment in which the corresponding segment component appears, and further based on the segment score computed for the segment in which the corresponding segment component appears;

a selector for selecting, from the segment components, instance candidates as part of an expanded set of terms contained in the same semantic category as the seed string based on the computed segment component score for each of the generated segment components, wherein the instance candidates include the seed string; and an extractor for:
ordering the search engine to search, using the instance candidates, a second set of documents containing the instance candidates and generate additional snippets from the second set of documents received from the search engine;

generating a connection graph indicating n-grams connected to each of the instance candidates from the additional snippets by searching using the instance candidates;

computing a semantic similarity between the seed string and the instance candidates based on a left-side context similarity between n-grams followed by the seed string and n-grams followed by each of the instance candidates in the connection graph, and based on a right-side context similarity between n-grams following the seed string and n-grams following each of the instance candidates in the connection graph; and extracting an instance that should be contained in the expanded set of terms from the instance candidates based on the semantic similarity, wherein, when the searcher orders the search engine to search, with the same semantic category as the seed string, the search engine outputs a third set of documents containing the expanded set of terms, including the extracted instance.

2. The set expansion processing device of claim 1, wherein:
the extractor computes the similarity between the seed string and the instance candidates based on similarities between n-grams connected to the seed string before the seed string and n-grams connected to the instance candidate before the instance candidates, and similarities between n-grams connected to the seed string after the seed string and n-grams connected to the instance candidate after the instance candidates.

3. The set expansion processing device of claim 2, wherein for each of the generated segments, when the variance or standard deviation of the lengths of the segment components appearing in that segment exceeds a predetermined threshold value, the corresponding segment score and the corresponding segment component score become values such that segment components contained in that segment are not selected by the selector as the candidates.

4. The set expansion processing device of claim 1, wherein for each of the generated segments, when the variance or standard deviation of the lengths of the segment components appearing in that segment exceeds a predetermined threshold value, the corresponding segment score and the corresponding segment component score become values such that segment components contained in that segment are not selected by the selector as the candidates.

5. The set expansion processing device of claim 1, wherein the segment component score of each segment component appearing in each of the generated segments decays exponentially with respect to the shortest distance between the position where the received seed string appears in that segment and the position where the segment component appears in that segment.

6. A set expansion processing method comprising steps performed by a computer, the steps comprising:
a receiving step of receiving a seed string from a user;

a search step of ordering a search engine to search, with the seed string, a first set of documents containing the seed string and generate snippets from the first set of documents received from the search engine;

a segment acquisition step of generating segments composed of strings by partitioning the generated snippets, including the seed string, using one or more predetermined segment partition strings, wherein the strings composing the segments are arranged in order of appearance;

a segment component acquisition step of generating segment components by partitioning each of the generated segments using one or more predetermined segment component partition strings;

a segment score computation step of computing a segment score for each of the generated segments based on the variance or the standard deviation from the mean value of the lengths of the segment components appearing in their corresponding segments;

a segment component score computation step of computing a segment component score for each of the segment components contained in each of the generated segments, based on a distance between the position of the seed string and the position of each corresponding segment component in the segment in which the corresponding segment component appears, and further based on the segment score computed for the segment in which the corresponding segment component appears;

a selection step of selecting, from the segment components, instance candidates as part of an expanded set of terms contained in the same semantic category as the seed string based on the computed segment component score for each of the generated segment components, wherein the instance candidates include the seed string; and an extraction step of:
ordering the search engine to search, using the instance candidates, a second set of documents containing the instance candidates and generate additional snippets from the second set of documents received from the search engine;

generating a connection graph indicating n-grams connected to each of the instance candidates from the additional snippets by searching using the instance candidates;

computing a semantic similarity between the seed string and the instance candidates based on a left-side context similarity between n-grams followed by the seed string and n-grams followed by each of the instance candidates in the connection graph, and based on a right-side context similarity between n-grams following the seed string and n-grams following each of the instance candidates in the connection graph; and extracting an instance that should be contained in the expanded set of terms from the instance candidates based on the semantic similarity, wherein, when the search engine is ordered to search with the same semantic category as the seed string, the search engine outputs a third set of documents containing the expanded set of terms, including the extracted instance.

* * * * *